Sept. 28, 1965 S. A. BONOMO 3,209,330

DATA PROCESSING APPARATUS INCLUDING AN ALPHA-NUMERIC SHIFT REGISTER

Filed April 26, 1961 11 Sheets-Sheet 1

INVENTOR
STEVEN A. BONOMO
BY Donald F. Voss
ATTORNEY

Sept. 28, 1965 S. A. BONOMO 3,209,330

DATA PROCESSING APPARATUS INCLUDING AN ALPHA-NUMERIC SHIFT REGISTER

Filed April 26, 1961 11 Sheets-Sheet 2

Sept. 28, 1965 S. A. BONOMO 3,209,330

DATA PROCESSING APPARATUS INCLUDING AN ALPHA-NUMERIC SHIFT REGISTER

Filed April 26, 1961 11 Sheets-Sheet 3

| CHARACTER | 2 OF 5 ALPHA | MAGNETIC TAPE BCD CODE | CHARACTER | 2 OF 5 ALPHA | MAGNETIC TAPE BCD CODE |
|---|---|---|---|---|---|
| 0 | 90 | 82 | O | 76 | CB42 |
| 1 | 91 | C1 | P | 77 | B421 |
| 2 | 92 | C2 | Q | 78 | B8 |
| 3 | 93 | 21 | R | 79 | CB81 |
| 4 | 94 | C4 | S | 82 | A2 |
| 5 | 95 | 41 | T | 83 | CA21 |
| 6 | 96 | 42 | U | 84 | A4 |
| 7 | 97 | C421 | V | 85 | CA41 |
| 8 | 98 | C8 | W | 86 | CA42 |
| 9 | 99 | 81 | X | 87 | A421 |
| +0 | 60 | BA82 | Y | 88 | A8 |
| -0 | 70 | CB82 | Z | 89 | CA81 |
| A | 61 | CBA1 | Δ DELTA | | CB8421 |
| B | 62 | CBA2 | BLANK | 00 | CA |
| C | 63 | BA21 | . PERIOD | 18 | CBA821 |
| D | 64 | CBA4 | ◊ LOZENGE | 19 | BA84 |
| E | 65 | BA41 | & AMPERSAND | 20 | BA |
| F | 66 | BA42 | $ DOLLAR | 28 | B821 |
| G | 67 | CBA421 | * ASTERISK | 29 | CB84 |
| H | 68 | CBA8 | - DASH | 30 | CB |
| I | 69 | BA81 | / DIAGONAL | 31 | A1 |
| J | 71 | B1 | , COMMA | 38 | A821 |
| K | 72 | B2 | % PERCENT | 39 | CA84 |
| L | 73 | CB21 | # POUND | 48 | C821 |
| M | 74 | B4 | AT | 49 | 84 |
| N | 75 | CB41 | | | |

FIG. 3

Sept. 28, 1965

S. A. BONOMO

DATA PROCESSING APPARATUS INCLUDING AN ALPHA-NUMERIC SHIFT REGISTER 3,209,330

Filed April 26, 1961

11 Sheets-Sheet 7

Sept. 28, 1965 S. A. BONOMO 3,209,330

DATA PROCESSING APPARATUS INCLUDING AN ALPHA-NUMERIC SHIFT REGISTER

Filed April 26, 1961 11 Sheets-Sheet 8

United States Patent Office 3,209,330

Patented Sept. 28, 1965

3,209,330

DATA PROCESSING APPARATUS INCLUDING AN ALPHA-NUMERIC SHIFT REGISTER

Steven A. Bonomo, Poughkeepsie, N.Y., assignor to International Business Machines Corporation, New York, N.Y., a corporation of New York Filed Apr. 26, 1961, Ser. No. 105,645

11 Claims. (Cl. 340—172.5)

This invention relates to data processing apparatus and, more particularly, to apparatus for processing data in different modes.

Data coming from a single data source is processed in one mode, while data coming from two sources is processed simultaneously in another mode. Essentially, the invention is directed to apparatus for controlling the operation of a shift register to enable selective serial shifting in different modes depending upon whether a single data character or two data characters are simultaneously transferred to or from the shift register.

The invention finds particular utility in data processing machines capable of processing mixed alphabetic and numeric data where the numeric data is represented by a single character and the alphabetic data is represented by two characters.

In the past it has been the practice to look at each character separately and successively whether numeric or alphabetic. This requires additional apparatus for storing the data or for translating the data when transferring data from the input and output units to the central processing unit. In many instances, it has resulted in separate translating units for alphabetic and numeric data.

The present invention enables the use of a single translating unit for both alphabetic and numeric data. Further, it eliminates the need for additional storage when transferring data from the input or output units to the translator. This results, not only in the saving of apparatus, but also reduces the data transfer time so as to speed up the data processing.

Accordingly, a prime object of the invention is to provide an improved arrangement of apparatus which processes data in different modes.

Another very important object of the invention is to provide a buffer storage register which is capable of processing mixed alphabetic and numeric data.

A more specific object of the invention is to provide controls for shifting data within and from a buffer storage register in first or second modes depending upon whether the data is alphabetic or numeric.

Another important object of the invention is to provide apparatus which is able to process data at lower costs and at higher speeds.

The foregoing and other objects, features and advantages of the invention will be apparent from the following more particular description of preferred embodiments of the invention, as illustrated in the accompanying drawings.

In the drawings:

FIG. 1 is a schematic view of the invention;

FIGS. 2*a* and 2*b*, with FIG. 2*a* disposed to the left of FIG. 2*b*, when taken together, schematically illustrate a data processing machine incorporating the invention;

FIG. 3 is a diagram illustrating the data characters in coded form;

Figure 5A:
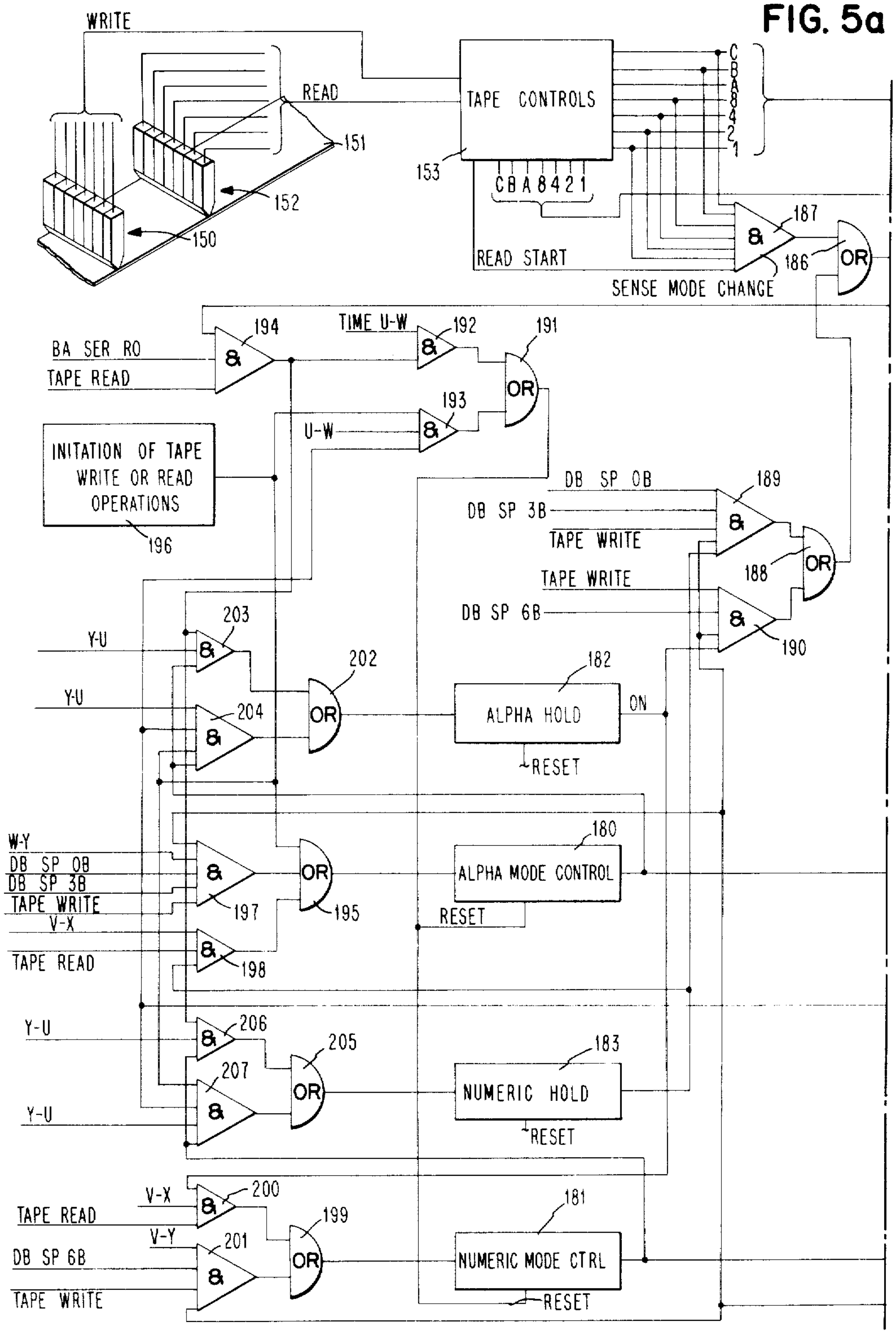
Figure 5B:
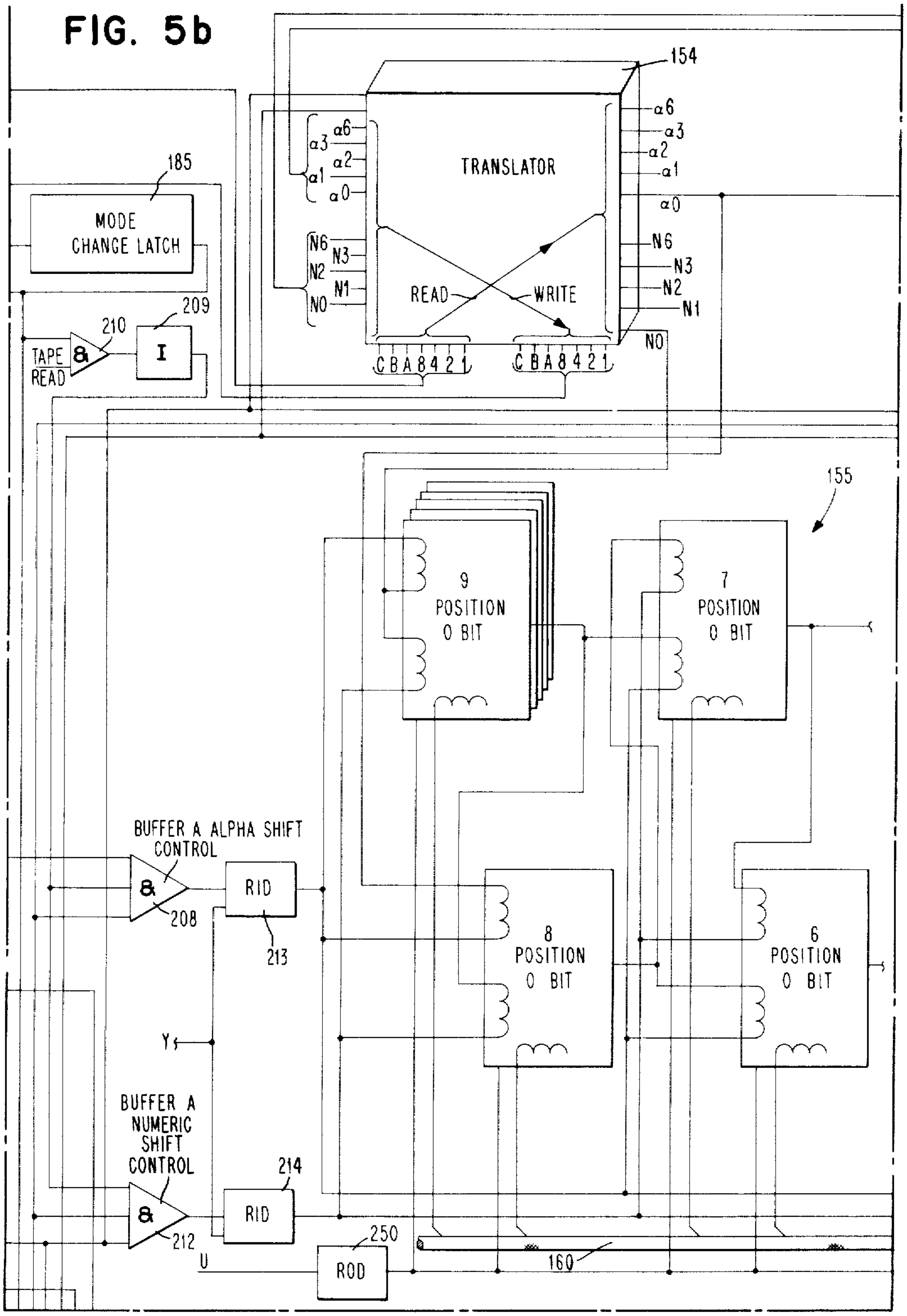
Figure 5C:
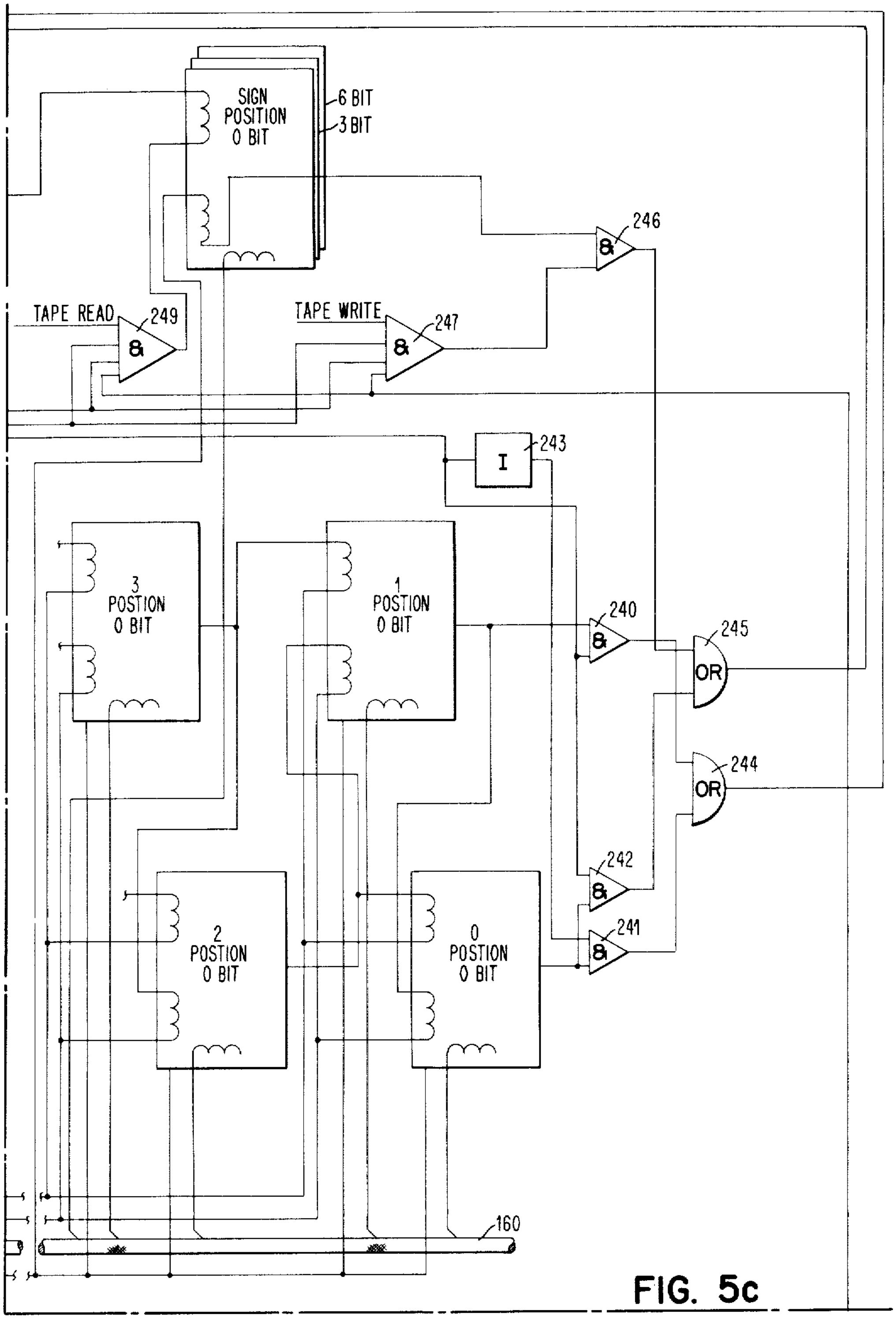
Figure 5D:
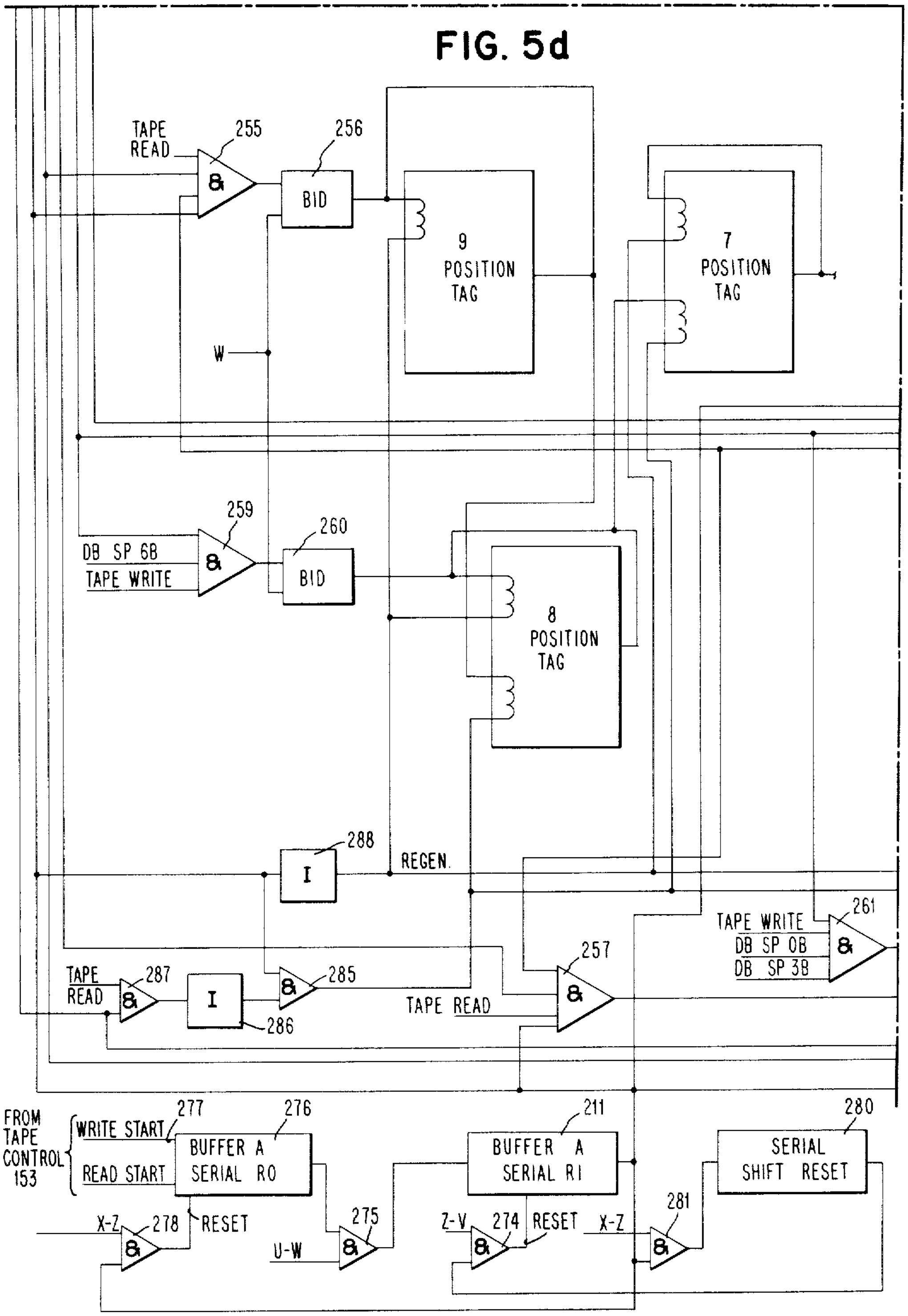
Figure 5E:
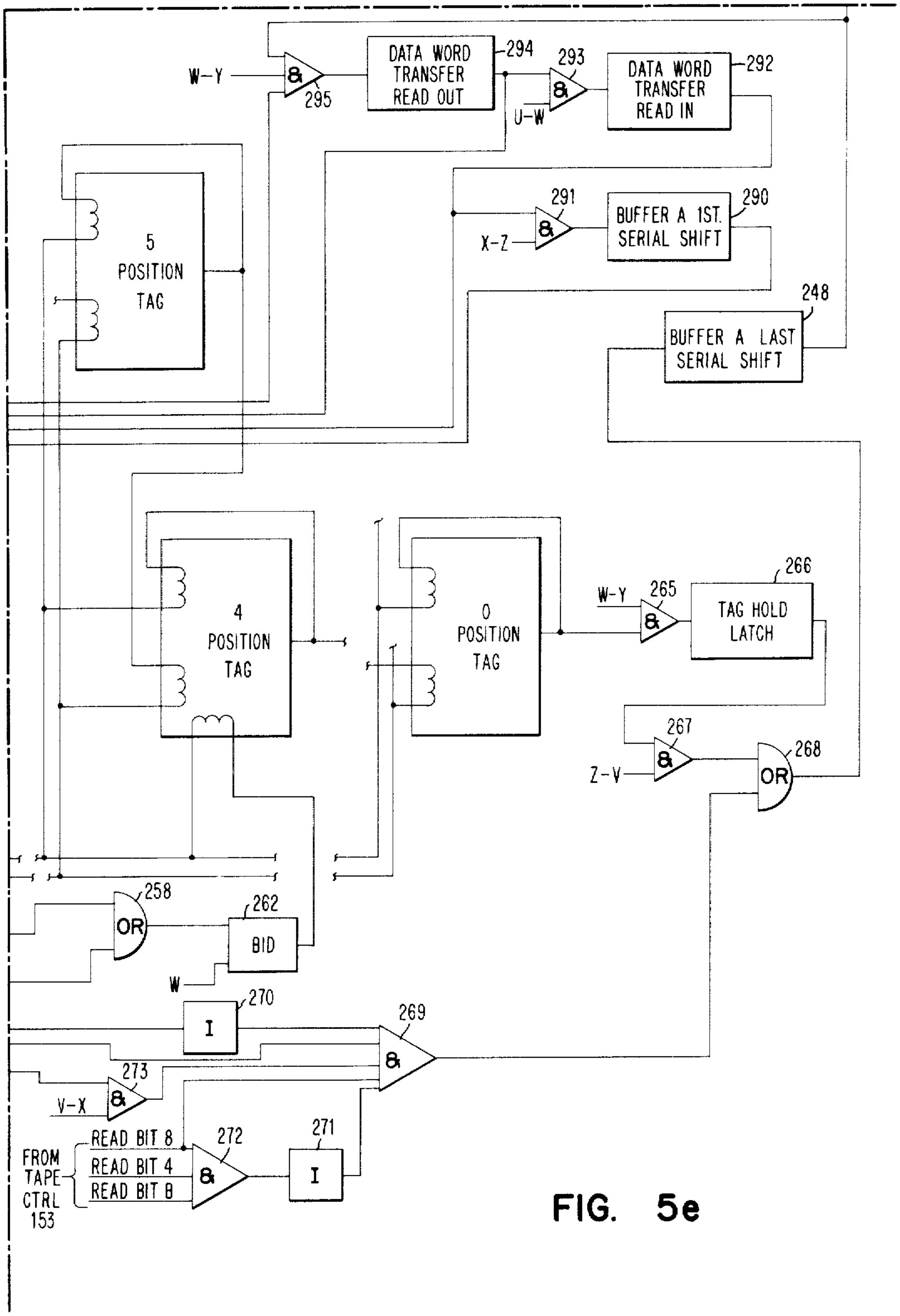
Figure 6:
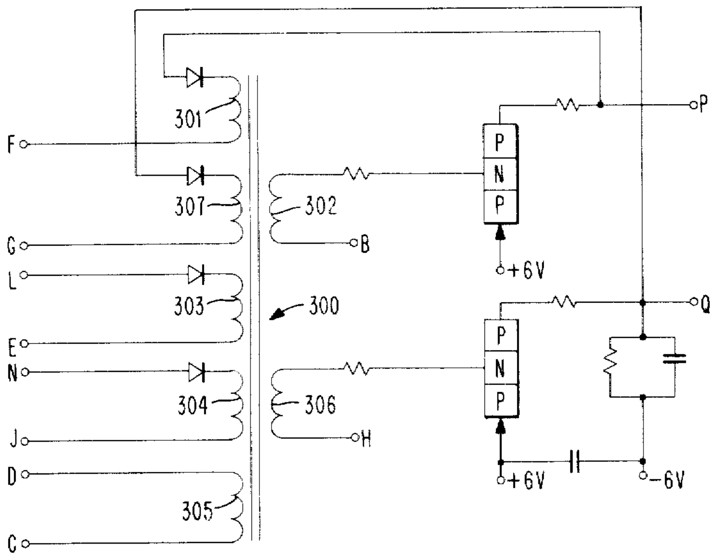
Figure 7:
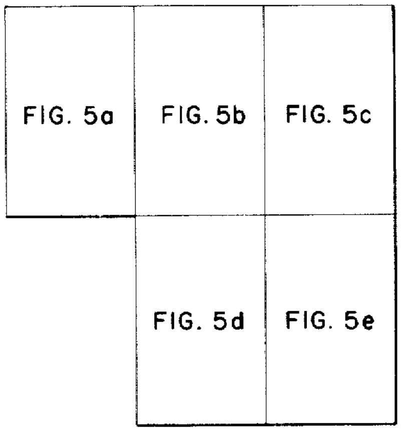

FIGS. 5*a*, 5*b*, 5*c*, 5*d* and 5*e* taken together as in FIG. 7 illustrate in greater detail the data source and shift register with controls therefor;

FIG. 6 is a schematic diagram illustrating in detail a typical position of the shift register; and, FIG. 7 is a schematic diagram showing the arrangement for FIGS. 5*a*, 5*b*, 5*c*, 5*d* and 5*e*.

Figure 1:
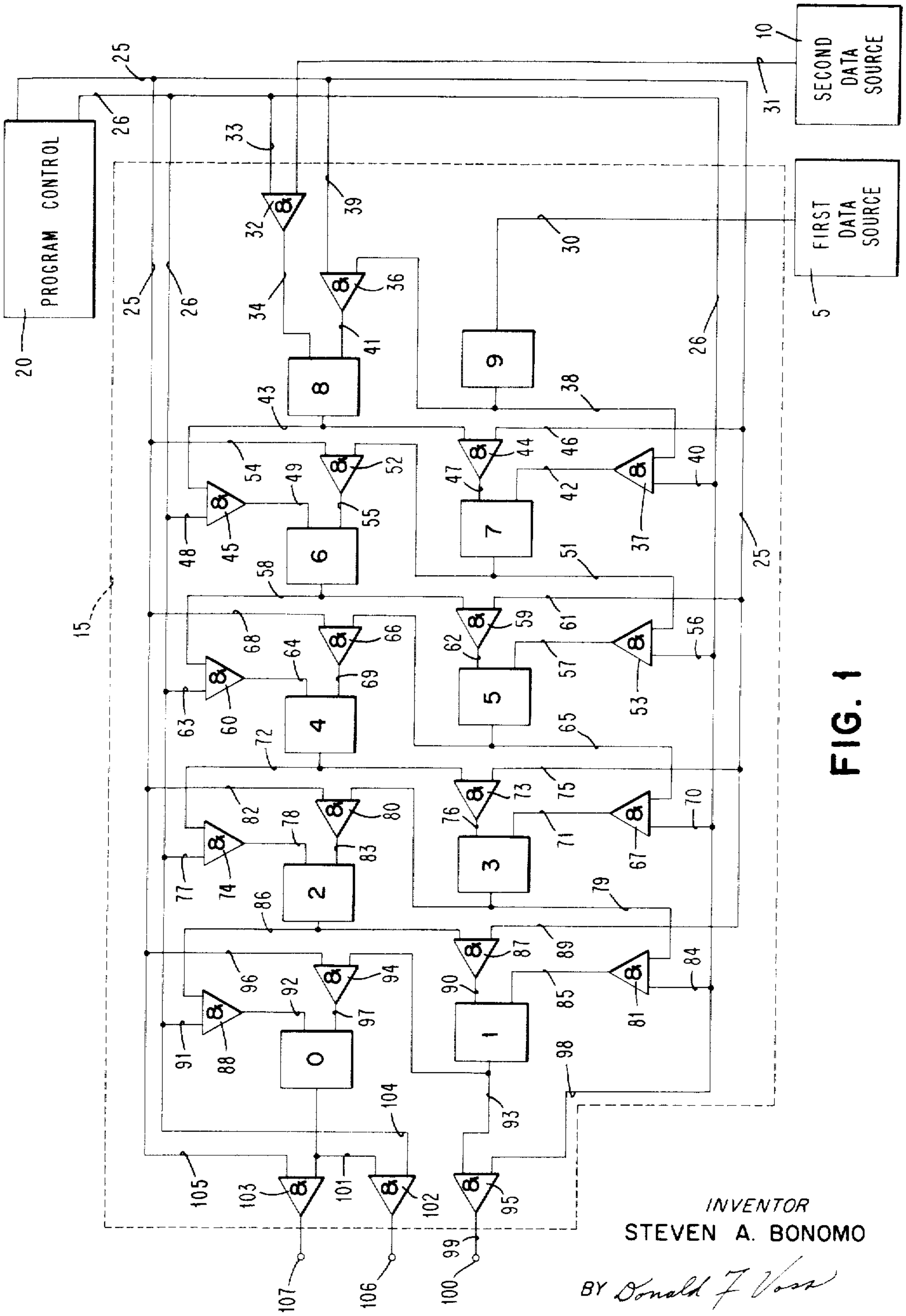

Referring to the drawings, the invention is illustrated in a very general manner in FIG. 1 in order to give greater appreciation of its many applications. Later herein, the invention will be illustrated and described by a specific example. It is to be understood that the specific example in no way limits other applications of the invention.

In FIG. 1, the invention, by way of example, includes first and second data sources 5 and 10, respectively, each having the facility for representing data by electrical signals representing single characters. Data is adapted to be transmitted searially from either the first data source 5 or both the first and second data sources 5 and 10 to a shift register 15 having a series of denominationally ordered character positions. If data is to be transmitted to the shift register 15 from the first data source 5 only, controls are provided, as will be seen shortly, to shift data within the shift register 15 in a first modes; whereas, if data is coming from both the first and second data sources, the shift register 15 is shifted in a second mode.

When data is transmitted to the shift register 15 from only the first data source 5, the data shifts within the shift register 15 successively from one denominationally ordered position to the next adjacent or descending denominationally ordered position, starting with the first denominationally ordered position. The output of data from the shift register 15 is then taken from the last denominationally ordered position.

When data is transferred to the shift register simultaneously from both the first and second data sources 5 and 10, respectively, the data from the first data source 5 is applied to the first denominationally ordered position and the data from the second data source 10 is applied to the second denominationally ordered position. Under this condition, data shifts within the shift register 15 successively from the first and second to alternately descending denominationally ordered positions; i.e., from the first to the third position and the second to the fourth position, etc. The output of data from the shift register 15 is taken from the last and second to the last denominationally ordered positions.

In this general example, the transfer of data from the first an dsecond data sources 5 and 10 to the shift register 15 is under program control. This can be accomplished by any suitable well-known means in the art. For instance, the program control could be a manual operation or an automatic control built into a machine such as a data processing machine. A specific control will be described later herein in connection with FIGS. 5*a*, 5*b*, 5*c*, 5*d* and 5*e*.

In FIG. 1, a program control unit 20 furnishes two control signals for gating data into and within the shift register 15 from the the first and second data sources 5 and 10, respectively. There is one control signal when data is to be transferred to the shift register 15 from only the first data source 5 and another control signal when data is to be transferred from both the first and second data sources 5 and 10. The control signal furnished by the program control unit 20 for controlling the transfer of data when data is due to be transferred from the first data source 5 only is supplied over electrical conductor 25, and the control signal for permitting the simultaneous transfer of data from both the first and second data sources 5 and 10 is supplied over conductor 26. It is to be understood that the control signals over conductors 25 and 26 do not occur simultaneously.

The shift register 15 in this example is shown as having ten denominationally ordered character positions 0–9, inclusive. The output of the first data source 5 is directly connected by means of a conductor 30 to the serial input of the first position or position 9. The second data source 10 has its output connected by conductor 31 to the input of a logical AND circuit 32 having another input connected by a conductor 33 to conductor 26. The output of logical AND circuit 32 is connected by conductor 34 to a serial input of position 8. The serial output of position 9 is connected as inputs to logical AND circuits 36 and 37 by means of a conductor 38. Logical AND circuits 36 and 37 also have inputs connected to conductors 25 and 26 by conductors 39 and 40, respectively. The output of logical AND circuit 36 is connected as a serial input to position 8 by means of conductor 41, and the output of logical AND circuit 37 is connected as a serial input to position 7 by means of a conductor 42. Hence, it is seen that, by this arrangement, data may be transferred from position 9 either to position 8 or 7 depending upon whether logical AND circuit 36 or 37 is conditioned. Logical AND circuit 36 is conditioned to pass data from position 9 by a signal over conductor 25 and logical AND circuit 37 is conditioned to pass data from position 9 by a signal over conductor 26.

The serial output of positon 8 is connected by means of a conductor 43 to inputs of logical AND circuits 44 and 45. Logical AND circuit 44 has another input connected to conductor 25 by means of a conductor 46. The output of logical AND circuit 44 is connected by conductor 47 to a serial input of position 7. Logical AND circuit 45 has another input connected to conductor 26 by means of a conductor 48. The output of logical AND circuit 45 is connected by conductor 49 to a serial input of position 6. Hence, it is seen that data may be transferred from position 8 to position 7 or to position 6 depending upon whether logical AND circuit 44 or 45 is conditioned. Logical AND circuit 44 is conditioned if data is being entered into the shift register 15 from first data source 5 only, whereas logical AND circuit 45 is conditioned if data is being entered into the shift register 15 from the first and second data sources 5 and 10, respectively.

The serial output of position 7 is connected by conductor 51 to inputs of logical AND circuits 52 and 53. Logical AND circuit 52 has another input connected to conductor 25 by means of a conductor 54. The output of the logical AND circuit 52 is connected to position 6 by means of a conductor 55. Logical AND circuit 53 has another input connected to conductor 26 by means of a conductor 56. The output of logical AND circuit 53 is connected to position 5 by means of a conductor 57. Hence, data will be transferred from position 7 either to position 6 or 5 depending upon whether logical AND circuit 52 or 53 is conditioned. Logical AND circuit 52 is conditioned when data is read in from first data source 5 only, and logical AND circuit 53 is conditioned when data is read from both the first and second data sources 5 and 10 respectively.

The serial output of position 6 is connected by means of a conductor 58 to inputs of logical AND circuits 59 and 60. Logical AND circuit 59 has another input connected to conductor 25 by means of a conductor 61. The output of logical AND circuit 59 is connected to position 5 by means of the conductor 62. Logical AND circuit 60 has another input connected to conductor 26 by means of a conductor 63. The output of logical AND circuit 60 is connected to position 4 by means of a conductor 64. Likewise, data will transfer from position 6 to position 5 or 4 depending upon whether logical AND circuit 59 or 60 is conditioned.

The serial output of position 5 is connected by conductor 65 to inputs of logical AND circuits 66 and 67. Logical AND circuit 66 has another input connected by conductor 68 to conductor 25. The output of the logical AND circuit 66 is connected to a serial input of position 4 by means of a conductor 69. Logical AND circuit 67 has another input connected to a conductor 26 by means of a conductor 70. The output of logical AND circuit 67 is connected to a serial input of position 3 by a conductor 71. Again, data will pass from position 5 to position 4 or 3 depending upon whether logical AND circuit 66 or 67 is conditioned.

The serial output of position 4 is connected by means of conductor 72 to inputs of logical AND circuits 73 and 74. Logical AND circuit 73 has another input connected to conductor 25 by means of a conductor 75. The output of logical AND circuit 73 is connected to a serial input of position 3 by means of a conductor 76. Logical AND circuit 74 has another input connected to conductor 26 by means of a conductor 77. The output of logical AND circuit 74 is connected to a serial input of position 2 by means of a conductor 78. Data will transfer from position 4 to either position 3 or 2 depending upon whether logical AND circuit 73 or 74 is conditioned.

The serial output of position 3 is connected by a conductor 79 to logical AND circuits 80 and 81. Logical AND circuit 80 has another input connected to conductor 25 by means of a conductor 82. The output of logical AND circuit 80 is connected to a serial input of position 2 by means of a conductor 83. Logical AND circuit 81 has another input connected to conductor 26 by means of a conductor 84. The output of logical AND circuit 81 is connected by a conductor 85 to a serial input of position 1. Data transfers from position 3 to position 2 or to position 1 depending upon whether logical AND circuit 80 or 81 is energized.

The serial output of position 2 is connected by means of a conductor 86 to inputs of logical AND circuits 87 and 88. Logical AND circuit 87 also has an input connected to conductor 25 by means of a conductor 89. The output of logical AND circuit 87 is connected to a serial input of position 1 by means of a conductor 90. Logical AND circuit 88 has another input connected to conductor 26 by means of a conductor 91. The output of logical AND circuit 88 is connected to a serial input of position 0 by means of a conductor 92. Hence, data flows from position 2 to position 1 or to position 0 depending upon whether logical AND circuit 87 or 88 is conditioned.

The serial output of position 1 is connected by a conductor 93 to inputs of logical AND circuits 94 and 95. Logical AND circuit 94 has another input connected to conductor 25 by means of a conductor 96. The output of logical AND circuit 94 is connected to a serial input of position 0 by means of a conductor 97. Logical AND circuit 95 has another input connected to conductor 26 by means of a conductor 98. The output of logical AND circuit 95 is connected by a conductor 99 to output terminal 100 of the shift register 15. Data is thus transferred from position 1 either to position 0 or to the output terminal 100 depending upon whether logical AND circuit 94 or 95 is conditioned.

The serial output of position 0 is connected by a conductor 101 to inputs of logical AND circuits 102 and 103. Logical AND circuit 102 has another input connected to conductor 26 by means of a conductor 104, and logical AND circuit 103 has another input connected to conductor 25 by means of a conductor 105. The outputs of logical AND circuits 102 and 103 are connected to output terminals 106 and 107, respectively.

When data is transferred to shift register 15 from the first data source 5 only, and data is successively shifted position by position throughout the shift register in a well-known manner by applying shift pulses to all stages of the register, data is shifted from position 9, to 8, to 7, to 6, to 5, to 4, to 3, to 2, to 1 to 0 and the output of the register will be taken from position 0 and it will be passed by logical AND circuit 103 to the output terminal 107. When data is being transferred from both the first and second data sources 5 and 10, respectively, to shift register 15, the data from the first data source 5 is shifted successively from position 9 to position 7, to position 5, to position 3, to position 1, to output terminal 100 via logical AND circuit 95 which is being conditioned by the control signal over conductor 26 and data from the second data source 10 will be transferred directly into position 8 and from position 8 to position 6, to position 4, to position 2, to position 0, the output from position 0 being transferred to output terminal 106 via the logical AND circuit 102 which is conditioned at this time by the signal over conductor 26.

Figure 2A:
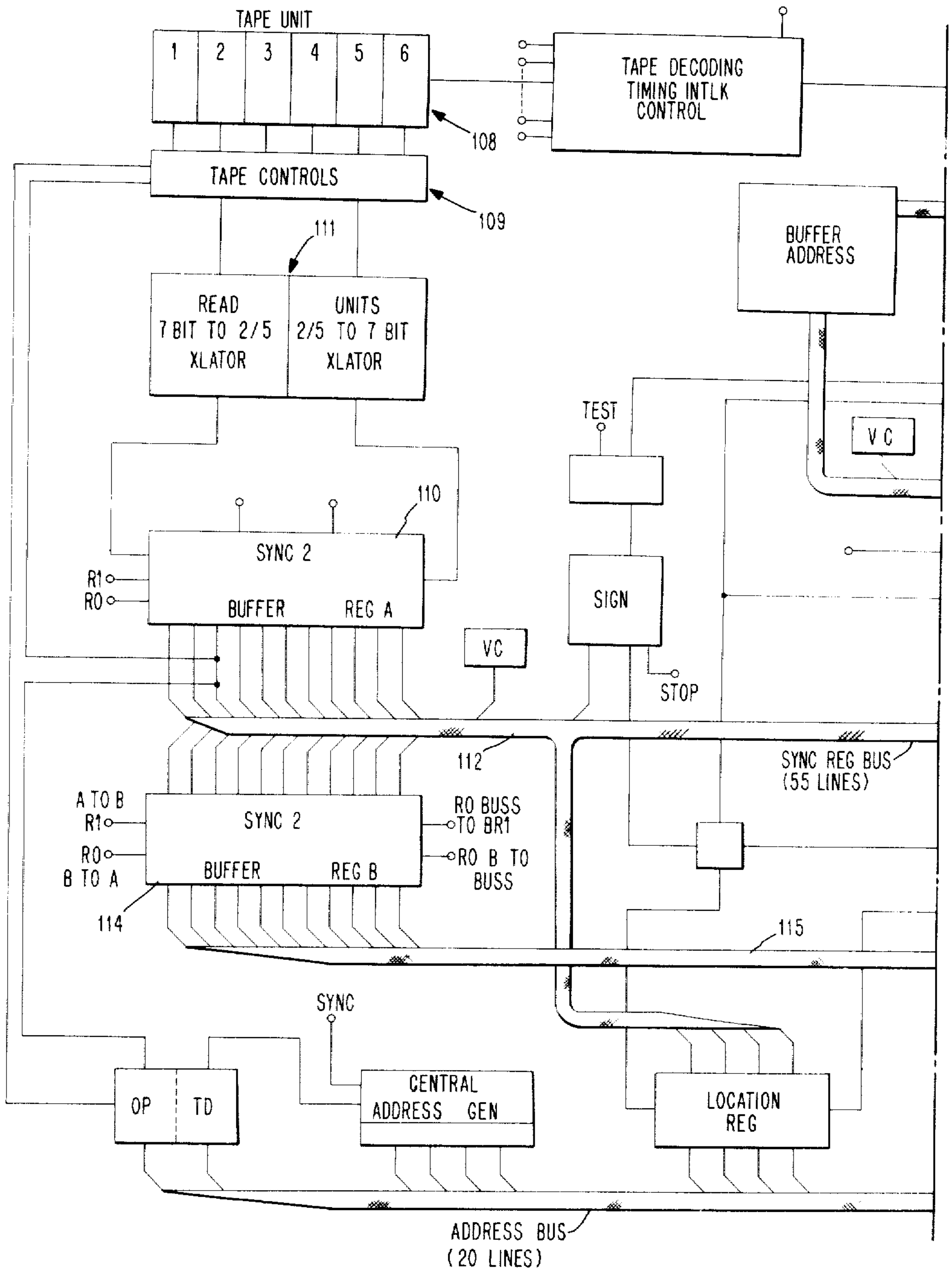
Figure 2B:
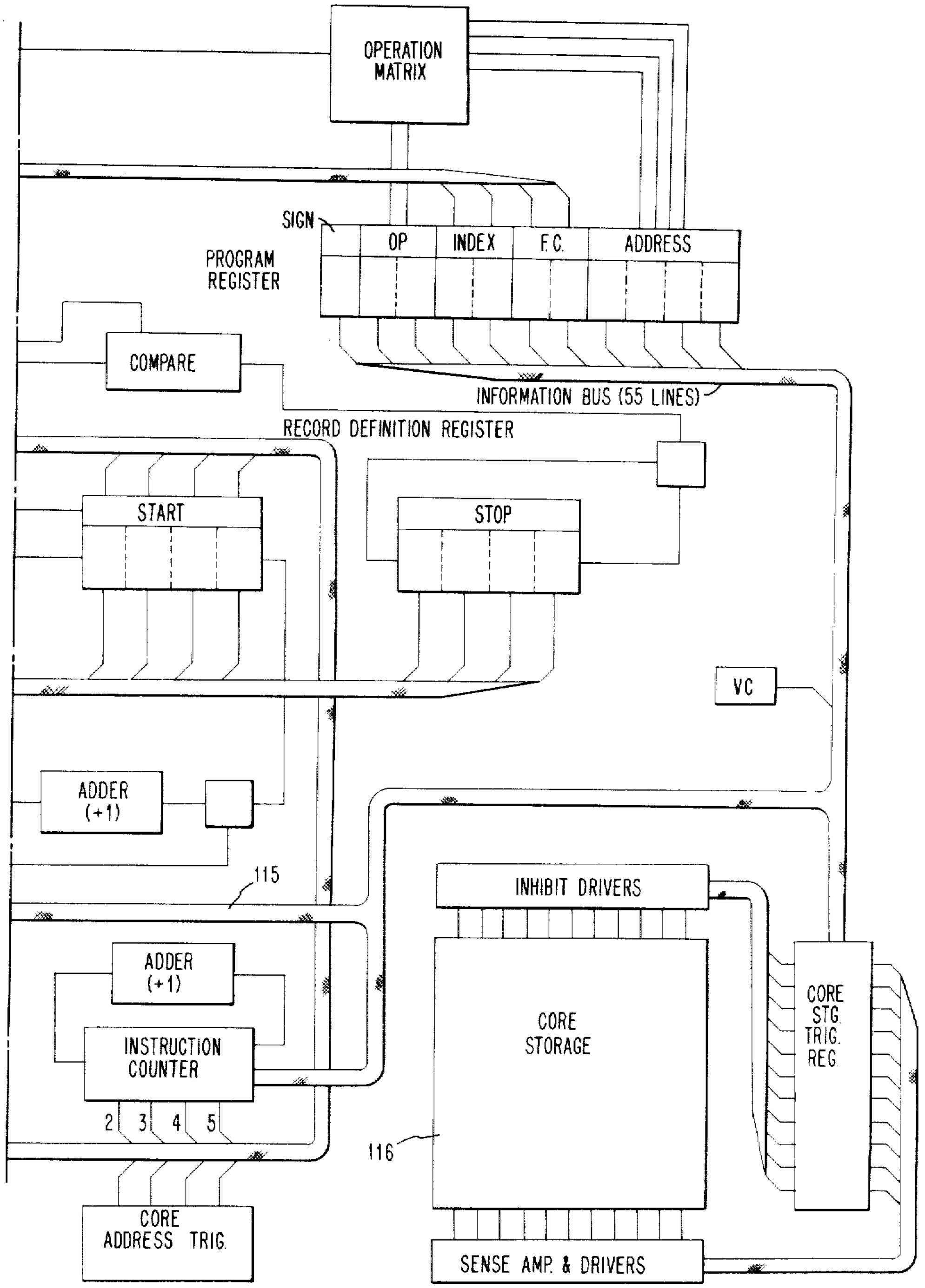

The embodiment of the invention shown in FIG. 1 finds utility in a data processing system as shown in FIGS. 2*a* and 2*b*, the same being shown and described in the patent to J. A. McDonnell et al., No. 2,968,027, dated January 10, 1961, and assigned to the same assignee as this patent. In FIG. 2*a*, Buffer Register A 110 generally takes the form of shift register 15 of FIG. 1 and, more particularly, of the shift register shown in FIG. 4. Translator 111 functions in a manner similar to the first and second data sources 5 and 10, respectively, of FIG. 1. The first data source 5, FIG. 1, may be considered that portion of the translator 111, FIG. 2*a*, which is termed the numeric portion and the second data source 10, FIG. 1, equivalent to the alpha portion of the translator 111. Data is read into and shifted within Buffer Register A 110 serially and, after the register is full, the data is transferred from the Buffer Register A 110 in parallel to a Sync or Distributor Bus 112. Data is then transferred in parallel from the Distributor Bus 112 to Buffer Register B 114. This transfer of data takes place in parallel. Data is then transferred from Buffer Register B, FIG. 2*a*, onto an Information Bus 115 which leads to controls for entering the data into Core Storage unit 116, FIG. 2*b*.

Data to be written by the tape units 108, FIG. 2*a*, is transferred from Core Storage unit 116, FIG. 2*b*, in parallel to Information Bus 115. Data upon the Bus 115 is transferred in parallel into the Buffer Register B 114, FIG. 2*a*, and from there is transferred in parallel to the Distributor Bus 112. The data is then entered into Buffer Register A 110 in parallel. Thereafter it is shifted from Buffer Register A 110 serially to the write portion of translator 111. The translated data is then passed through the Tape Control unit 109 to the tape units 108.

The shift register 15, FIG. 1, finds particular utility in the particular data processing system shown in FIGS. 2*a* and 2*b* because in that system numeric data is represented in a 2-out-of-5 bit code by a single character while alphabetic data is represented by two characters. Hence, when data is read serially from tape units 108 to the translator 111, FIG. 2*a*, if the data is alphabetic, then two characters will be flowing simultaneously from the translator 111. The Buffer Register A 110, i.e., shift register 15, is able to handle the two data characters applied simultaneously to it in the manner described above. Similarly, when data is to be transferred serially from Buffer Register A 110 to the write portion of translator 111 which translates the data so that it may be recorded by the tape units 108, two characters are furnished simultaneously from the Buffer Register A 110; i.e., shift register 15, to the translator 111. By this arrangement, the need for additional storage or a separate translator for alphabetic and for numeric data is eliminated.

Figure 4:
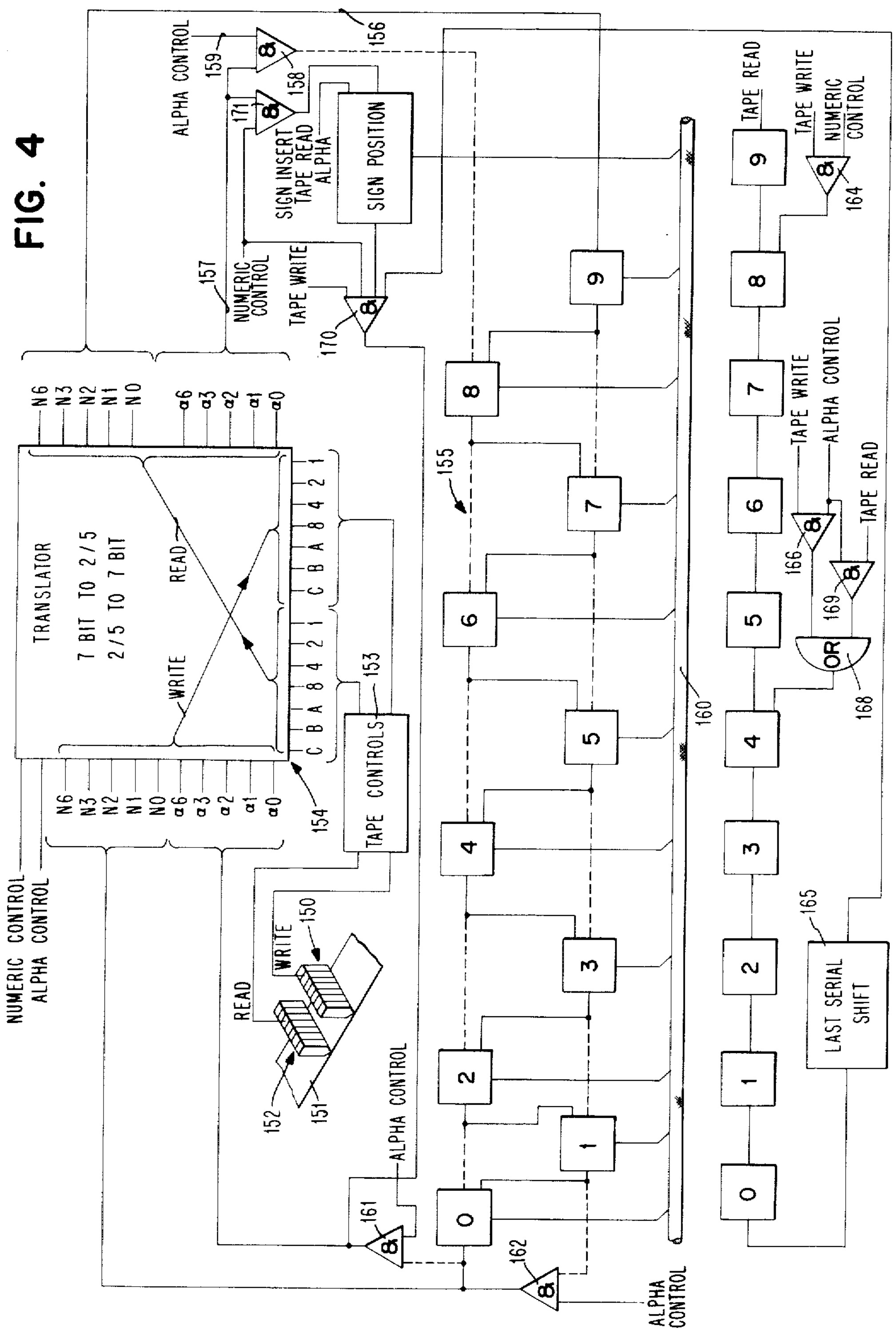
FIG. 4 is a schematic diagram illustrating the data source and the shift register with controls therefor of the invention as incorporated in a data processing machine as in FIGS 2*a* and 2*b*.

The Buffer Register A 110 of FIG. 2*a* is similar to shift register 155 schematically illustrated in FIG. 4. The shift register 155 shown in FIG. 4 is very similar to shift register 15 shown in FIG. 1. However, it further includes apparatus for keeping track of the number of places to be shifted. This is referred to as the TAG portion of the shift register.

Specifically, in FIG. 4, data in coded form is written by magnetic write heads 150 upon tape 151 and data either previously recorded upon tape 151 or recorded by magnetic write heads 150 is read by magnetic read heads 152. The data read by read heads 152 is represented by bits constituting a well-known code including the bits C, B, A, 8, 4, 2, 1, sometimes referred to as a 7-bit code. The data read by read heads 152 is transmitted parallel by bit and serial by character through tape control unit 153 to a translator 154 having both a read portion and a write portion. The translator 154 may be any suitable type well known in the art which provides translation from 7-bit code to 2-out-of-5 and from 2-out-of-5 to the 7-bit code. Magnetic tape wound cores have worked very satisfactorily for this type of translator.

Generally, translator 154 may be of the type where the principle of operation is essentially one of negative logic. A separate core is utilized for each character, the characters being illustrated in FIG. 3. Instead of passing windings through the core which represent the character, windings representing the negative of the character are passed through the core. In addition to the separate cores for the characters, the translator includes cores for parity checking and noise cancellation. In addition to the windings representing the character, control windings thread the cores. These control windings include a readout winding, a set winding, an alpha character winding, a numeric character winding, and a sign character winding. The current in the set winding flows in the opposite direction to the current in all other data input or control windings. Each core which translates a character has the proper number of sense windings necessary to translate that character to its decimal equivalent in the 2-out-of-5 code as well as a readout sense winding.

The operation of the translator may be characterized in that, initially, all cores are set in the zero state. A full current set pulse then switches all cores to the one state. The negative of the character read from the tape is transferred to the cores on seven lines, each carrying a full current. The necessary control input lines are also pulsed with full current. All information cores except the one representing the specific character read from tape are consequently switched to the zero state. A readout pulse is then set through the matrix and this switches the information core containing the character read from tape to the zero state. At this time the proper sense windings representing the character in a 2-out-of-5 code, together with the readout sense winding, translate the character and signal that the translation has taken place. The translator 154 operates either in an alpha or numeric mode. Translator 154 has numeric outputs and inputs of N6, N3, N2, N1 and N0 and alphabetic outputs and inputs of alpha ($\alpha$) 6, alpha 3, alpha 2, alpha 1 and alpha 0. When in the numeric mode, there will be two bits representing a numeric character on two of the five numeric outputs. However, when in the alpha mode, there are two bits on two out of the five numeric outputs and two bits on two out of the five alpha outputs to represent two characters which in turn represent an alphabetic character.

The bit lines representing numeric outputs are shown as being commoned to a single conductor 156 which is connected to position 9 of shift register 155. The bit lines representing the alphabetic outputs are shown as being commoned into a single conductor 157 which is connected as an input to a logical AND circuit 158. The logical AND circuit 158 is conditioned by means of an alpha control signal transmitted over conductor 159 connected to one of the inputs thereof. The output of the logical AND circuit 158 is connected as an input to position 8 as shown by the dashed line. The dashed lines connecting the positions of the shift register 155 represent the data path taken when the register is shifted or operated in the alpha mode or under alpha control. The solid lines connecting the positions of the shift register 155 represent the data path taken when shifted or operated in the numeric mode or under numeric control. All positions of the shift register 155 are connected to a Bus 160 so that data may be transferred to and from shift register 155 in parallel. The Bus 160 is similar to the Bus 112 in FIG. 2*a*. When in the numeric mode, the output of the shift register 155 is taken from position zero. When in the alpha mode, logical AND circuits 161 and 162 are conditioned so that outputs may be taken from positions 1 and 0 of shift register 155.

In order to keep track of the number of places to be shifted, a TAG portion has been added to shift register 155. The tag portion of the shift register 155 facilitates the serial transfer of complete words to and from the shift register. The necessity for keeping track of the places to be shifted is that each word consists of ten characters and a sign. For a numeric word, the sign is recorded on tape in combination with the numeric value of the units or low order position of the word and, when the word is transferred to core storage, the sign is written in a signs position for each word. A plus sign is represented by the bits B and A in the 7-bit code. A minus sign is represented by the B bit only. The sign bits are thus combined with the numeric value in the units position of a word to result in an alphabetic character. Hence, when this character is translated, the numeric bits are passed by conductor 156 and the alpha bits by conductor 157. However, since the word is numeric, the alpha control signal will not be present to condition logical AND circuit 158. Hence, the alpha bits will not transfer into position 8. The alpha bits will transfer to the sign position because logical AND circuit 171 will be conditioned by numeric control. An alphabetic word is not accompanied by a sign on tape. However, when an alphabetic word is read from tape, a sign or alphabetic designation consisting, in this example, of a zero and a three bit is entered into the sign position of the shift register 155. The sign or alphabetic designation is transferred to and from the sign position to the bus 160 when transferring to and from core storage.

The tag portion consists of ten denominationally ordered bit positions connected so that the data bit or tag bit may be transferred serially successively from one position to an adjacent position. When a numeric word consisting of ten characters is to be transferred from the shift register 155 through the translator 154 so as to be written onto tape 151 by the write heads 150, the tag bit is inserted into position 8 under control of logical AND circuit 164 having inputs for receiving a Tape Write signal and a Numeric Control signal. As the tag bit advances out of position 0, it is sensed. This signifies that one more left shift is to be taken. The tag bit coming out of position 0 sets a Last Serial Shift latch 165. Because an alpha word takes only five left shifts, the tag bit is inserted into position 4. This is accomplished by means of a logical AND circuit 166 having inputs connected to conductors for passing a Tape Write signal and an Alpha Control signal. The output of the logical AND circuit 166 is connected as an input to a logical OR circuit 168 having its output connected to the input of position 4. When the tag bit advances into position 0, it signifies that one more left shift is to be taken. When in the alphabetic mode, the tag bit advances position by position while data in the other positions of the register are effectively advanced two positions at a time.

During tape read operations for a numeric word, the tag bit is inserted into position 9 of the tag portion of register 155. If the tag bit is read out of position 0 during a numeric read operation, an error condition is developed which signifies a missing sign over units. For an alphabetic word, the tag bit is inserted into position 4 during a read operation. This is accomplished by a logical AND circuit 169 having an input connected to a conductor for receiving a Tape Read signal and an input connected to a conductor for receiving an Alpha Control signal. The output of the logical AND circuit 169 is connected to logical OR circuit 168.

Shift register 155 also includes the sign position because a sign accompanies each numeric word as mentioned above. The sign may be plus or minus and is combined with the numeric value of the units position of the word, hence resulting in an alphabetic character, as will be seen later herein. The transfer of the sign from the sign position to the translator 154 is under control of a logical AND circuit 170 having an input connected to the sign position, an input connected to the output of Last Serial Shift latch 165, an input connected to receive a Tape Write Control signal and an input connected to receive a Numeric Control signal. The output of the logical AND circuit 170 is connected to the alpha inputs of the translator. The transfer of the sign from the translator 154 to the sign position on a tape read operation, as stated above, is under control of a logical AND circuit 171 which has one input connected to receive a Numeric Control signal and another input connected to conductor 157 for receiving the alphabetic bits forming the sign.

FIGS. 5*a*, 5*b*, 5*c*, 5*d* and 5*e*, arranged as shown in FIG. 7, show the shift register 155 and the controls for shift register 155 of FIG. 4 in greater detail. Control of the type of shift to be performed by the shift register 155 is maintained by alpha mode and numeric mode latches 180 and 181, respectively. The alpha mode latch 180 is set at the start of each operation. Thereafter the setting is determined by analyzing the sign of each word during a write operation or by detecting a mode change character during a read operation. If the alpha mode latch is on, the translator translates in the alpha mode; and with the numeric mode latch on, it translates in the numeric mode. During a read operation, the mode change is accomplished by detection of the mode change character which is used to signify the mode change from numeric to alpha as well as from alpha to numeric. The mode change character (Δ) is recorded upon the tape, but it is never transferred to core storage from tape. Hence, during a tape read operation, the change from numeric to alpha mode and vice versa takes place upon sensing a mode change character; whereas, during a tape write operation, the sign accompanying the word in storage determines the mode. The sign of each word is written as a zone indication with the units position. An alphabetic word does not have a sign written therewith. For example, a numeric word is entered into storage as +0123468924 and is written on tape as Δ 012346892D, the D being a combination of the numeric value in the units position; i.e., (4), and the sign; i.e. (+), or the bits BA. Referring to FIG. 3, it is seen that a D is represented by the bits CBA4 in the 7-bit, the C bit being automatically added as a check bit. The character D is represented by characters 6 and 4 in the 2-out-of-5 code. The character 6 is the alpha portion and is represented by bits 0 and 6, and the character 4 is the numeric portion and is represented by bits 1 and 3. Assuming the next word is alphabetic, then this word appears in storage as A7461889190 and is written on tape as Δ MAY 10, the A being an indication that it is an alphabetic word. It should be noted that the numbers 0 through 9 in FIG. 3 are shown as an alphabetic representation in the 2-out-of-5 code because mixed data can be handled. However, when in the numeric mode, the numbers 0 through 9 are represented by a single character in the 2-out-of-5 code.

During read operations, the zone indication; i.e., the sign combined with the numeric value of the units position, in a numeric word is used to signify the end of the word, while a tag bit is used to signify the end of an alphabetic word.

Associated with the alpha mode control and numeric mode control latches 180 and 181 are alpha hold and numeric hold latches 182 and 183, respectively. The function of the alpha and numeric hold latches 182 and 183 is to provide an indication of the previous operation because, as it will be seen shortly, both the alpha and numeric control latches 180 and 181 are reset by a control signal termed Data Word Transfer Readout. The control signals are developed by the logic shown in FIGS. 5*a*, 5*b*, 5*c*, 5*d* and 5*e* through the facility of a 6-stage clock, not shown, driven by primary pulses occurring at a 500 kilocycle rate to derive six microsecond outputs from each of the six outputs which are termed, for purposes of identification, as U, V, W, X, Y and Z. Generally, the control signals, aside from the timing signals from the clock or combinations thereof include a Tape Read signal, a Tape Write signal, Write Start and Read Start signals, a Write Control signal, a Buffer A First Serial Shift signal, a Buffer A Last Serial Shift signal, a Buffer A Serial Read-in signal, a Buffer A Serial Readout signal, a Translator Readout Sample signal, a Data Word Transfer Read-in signal, and a Data Word Transfer Read-out signal. The elements creating these control signals will be described as the description of FIGS. *5a*, *5b*, *5c*, *5d* and *5e* progresses.

The turning on of the alpha hold or numeric hold latches 182 and 183, FIG. *5a*, is dependent upon the previous setting of the alpha and numeric control latches 180 and 181. For example, when changing from alpha mode to numeric mode, the mode change is sensed and this causes the setting of a mode change latch 185, FIG. *5b*. Following the setting of the mode change latch 185, the alpha hold latch 182, FIG. *5a*, is set on because the alpha mode control latch 180 is on at the time the mode change was sensed. With the setting of the alpha hold latch 182, the alpha mode control latch 180 is turned off and the numeric mode control latch 181 is turned on. When changing from numeric mode to alpha mode, the mode change is sensed, thereby causing the setting of mode change latch 185. Following the setting of the mode change latch 185, the numeric hold latch 183 is set. The numeric control latch 181 turns off and the alpha mode control latch 180 is set on.

The set terminal of the mode change latch 185, FIG. *5b*, is connected to a logical OR circuit 186, FIG. *5a*, having inputs from the output of a logical AND circuit 187 and the output of a logical OR circuit 188. The logical AND circuit 187 has inputs connected to the bit lines C, B, 8, 4, 2, 1 coming from the tape control unit 153 and a conductor for receiving a control signal termed "READ START" which also comes from the tape control unit 153. The tape control unit 153 is of the type well known in the art and has separate read and write clocks. The read clock, not shown, starts for one cycle when the first character is set into the read register, not shown, of the tape control unit 153. During the read clock cycle, the character set into the read/write register, not shown, becomes available to the system through the output of the tape control unit 153. The read clock stops after a read/write register is set. The next character set into the read register starts the read clock again for one more cycle, etc., until the complete record is read from tape. In each read clock cycle, a timing circuit, not shown, is activated to try to stop the read operation; but so long as characters arrive at specified time intervals, it is reset before it can complete its function. During a write operation, after the tape control unit 153 sends a "go" signal to the tape unit, the tape unit starts moving and, because it takes time for the tape to reach its proper speed, the tape control unit 153 initiates a Write Delay signal before the write circuits become active. When the Write Delay signal is completed, the write clock, not shown, of the tape control unit 153, starts in order to control writing. The write clock pulses set the data coming into the tape control unit 153 into the read/write register of the tape control unit 153. As soon as the data is in the read/write register, it becomes available to the write heads 150. Another write clock pulse is developed into a write pulse and sent to the tape unit where it initiates the writing action. The write clock, when started, is in repetitive cycles and the writing action continues until stopped by another request signal controlling the tape unit.

The logical OR circut 188, FIG. *5a*, has inputs connected to outputs of logical AND circuits 189 and 190. Logical AND circuit 189 has inputs connected to the output of numeric hold latch 183 and inputs connected to conductors for receiving a Data Word Transfer Read-in Control signal, a Tape Write Control signal and conductors connected to the Distributor Bus Sign Position for the zero bit and three bit. Logical AND circuit 190 has an input connected to the output of the alpha hold latch 182 and inputs connected to conductors for receiving a Tape Write Control signal and a Data Word Transfer Read-in Control signal and a conductor connected to the Distributor Bus Sign Position six bit. By this arrangement, the mode change latch 185 may be set on both during a read or write operation.

During a write operation, the mode change latch 185 functions to suspend shifting of the register in order to permit the writing of a mode change character on the tape prior to writing the data word. The setting of the mode change latch 185 is under control of logical AND circuits 189 and 190. The first write clock pulse from the tape control unit 153 records the mode change character on tape. The write clock pulse also causes the register to shift and, if in the numeric mode, to place a numeric character into the translator.

The alpha mode control and the numeric mode control latches 180 and 181, FIG. *5a*, have their reset terminals connected to the output of a logical OR circuit 191 having inputs connected to the outputs of logical AND circuits 192 and 193. Logical AND circuit 192 has an input connected to a conductor for receiving a timing pulse having a duration from U to W; an input connected to an output of logical AND circuit 194, the same having an input connected to an output of the mode change latch 185; an input connected to a conductor for receiving a control signal Buffer A Serial Readout and another input connected to receive a control signal Tape Read. The logical AND circuit 193 has an input connected to a conductor for receiving a Write Control signal, an input connected to a conductor for receiving a Data Word Transfer Readout signal and an input connected to a conductor for receiving a timing signal U to W.

The alpha mode control latch 180 has its set terminal connected to the output of a logical OR circuit 195 having an input connected to a conductor connecting to a control unit 196 termed "Initiation of Tape Write or Read Operations" and an input connected to outputs of logical AND circuits 197 and 198. Logical AND circuit 197 has an input connected to a conductor for receiving a W to Y control signal, an input connected to a conductor connected to the Distributor Bus Sign Position zero bit, an input connected to a conductor connected to the Distributor Bus Sign Position three bit, an input connected to a conductor for receiving a Data Word Transfer Read-in Control signal and an input connected to a conductor for receiving a Tape Write Control signal. Logical AND circuit 198 has an input connected to a conductor for receiving a timing signal V to X, an input connected to a conductor for receiving a Tape Read Control signal and an input connected to the output of numeric hold latch 183. Hence, the alpha mode control latch 180 may be set during a tape read operation when the numeric hold latch 183 is on or it may be set during a tape write operation, if the three bit and zero bit are present on the conductors of the Distributor Bus 160 for the sign bits.

The set terminal of the numeric mode control latch 181, FIG. *5a*, is connected to the output of a logical OR circuit 199 having inputs connected to outputs of logical AND circuits 200 and 201. The logical AND circuit 200 has an input connected to a conductor for passing the timing signal V to X, an input connected to a conductor for passing a control signal Tape Read and an input connected to the output of the alpha hold latch 182. The logical AND circuit 201 has an input connected to a conductor for passing the timing signal V to Y, an input connected to a conductor connected to the Distributor Bus Sign Position six bit, an input connected to a conductor for receiving a Tape Write Control signal and to a conductor for receiving the Data Word Transfer Read-in Control signal. Hence, during a tape read operation, the numeric mode control latch 181 may be set if the alpha hold latch 182 is on. The numeric mode control latch 181 may be set during a tape write operation if a bit is present on the Distributor Bus Sign Position six bit.

The set terminal of the alpha hold latch 182 is connected to the output of a logical OR circuit 202 having inputs connected to outputs of logical AND circuits 203 and 204. The logical AND circuit 203 has an input connected to the output of logical AND circuit 194, an input connected to a conductor for receiving a Y to U pulse and an input connected to the output of the alpha mode control latch 180. A logical AND circuit 204 has an input connected to a conductor for receiving a control signal Data Word Transfer Readout, an input connected to a conductor for receiving a Write Control signal, an input connected to a conductor for receiving a timing pulse Y to U, and an input connected to the output of the alpha mode control latch 180. The numeric hold latch 183 has its set terminal connected to the output of a logical OR circuit 205 having inputs connected to outputs of logical AND circuits 206 and 207. Logical AND circuit 206 has an input connected to the output of logical AND circuit 194, an input connected to a conductor for receiving a timing pulse Y to U, and an input connected to the output of the numeric mode control latch 181. The logical AND circuit 207 has an input connected to a conductor for receiving a Data Word Transfer Readout Control signal, an input connected to a conductor for receiving a Write Control signal, an input connected to a conductor for receiving a timing signal of Y to U and an input connected to the output of the numeric mode control latch 181. Hence, the numeric hold latch 183 may be set if the numeric mode control latch 181 is on.

The output of the alpha mode control latch 180, FIG. 5*a*, is connected to an input of a logical AND circuit 208, FIG. 5*b*, and is also connected to control the translator 154 in an alpha mode. The other inputs to the logical AND circuit 208 will be described shortly, but it may be stated that the logical AND circuit 208 controls the shifting of the register in an alpha mode. The logical AND circuit 208 has an input connected to the output of an inverter 209, the same having its input connected to the output of a logical AND circuit 210, FIG. 5*b*. The logical AND circuit 210 has an input connected to a conductor for receiving a Tape Read control signal and an input connected to the output of the mode change latch 185. Logical AND circuit 208 also has an input connected to the output of a latch 211, FIG. 5*d*, designated Buffer A Serial Read-in latch. The output of the numeric mode control latch 181 is connected to the input of a logical AND circuit 212 also having an input connected to the output of the buffer A Serial Read-in latch 211, FIG. 5*d*, and an input connected to the output of the inverter 209, FIG. 5*b*. It is thus seen that logical AND circuit 212 controls the shift register 155 in a numeric mode. Serial entry of data into the shift register 155 is thus under control of logical AND circuits 208 and 212.

The output of the logical AND circuit 208 is connected to a read-in driver 213 which is driven by a Y impulse. The output of the logical AND circuit 212 is connected to a read-in driver 214 which is also impulsed by a Y pulse. The shift register 155 has ten denominationally ordered character positions, each character position having five bit positions, only the zero bit position being shown for denominationally ordered positions of 9 to 6 to 3 to 0. Essentially, each bit position of each data position of the shaft register has three inputs and three outputs. The positions shown are sufficient to illustrate the operation of the shift register in both the alpha and numeric modes. The inputs are schematically shown as windings which would thread a magnetic core, not shown.

In FIG. 6, a typical bit position of a typical data position of the shift register 155 is shown. A single magnetic core 300 stores a data bit. Winding 301, essentially, has one portion connected to a read-in, readout terminal P, another portion connected to read-in control terminal F. Winding 302 is connected between terminal P and a readout control terminal B. This winding 301 enables the read-in, and winding 302 enables the readout of a data bit from and to the associated bit line of the Distributor Bus 160, shown in FIGS. 5*b* and 5*c*. A read-in control impulse is applied to terminal F, FIG. 6, to enable a data bit to transfer from the Distributor Bus 160 to set the core 300. When a readout control impulse is applied to terminal B, the data bit set in the core 300 is transferred to the Distributor Bus 160. The numeric input for the associated bit value or position is connected to terminal L which is connected to one portion of a core winding 303. Terminal E, also connected to winding 303, controls the read-in of the numeric bit. The alpha input for the particular bit position is connected to terminal N which is connected to a coil winding 304. Terminal J, also connected to coil winding 304, controls the read-in of the alpha bit representation.

When a bit is to be shifted or read into the shift register, a Y timing impulse is applied to terminal D which is connected to coil winding 305. Terminal C, also connected to coil winding 305, connects to terminal D of the adjacent data character position of the shift register.

The serial output of the bit position for the particular character position is taken from terminal Q, the readout being under control of U timing impulse which is applied to terminal H, the same being connected to a coil winding 306. A regeneration control signal is applied to terminal G to enable the serial output to be regenerated so as to again set the core, if it is not desired to shift the shift register. The terminal G is connected to coil winding 307.

The numeric zero output terminal of the translator 154 is commonly connected to two of the input windings of the ninth zero bit position of the shift register 155, FIG. 5*b*. The other ends of these two input windings for the ninth zero bit position are connected to read-in drivers 213 and 214, respectively. The third input winding for the ninth position is connected to the Distributor Bus 160 for facilitating parallel transfer of data into and from the shift register 155. The serial output for zero bit position of position 9 is connected to a read-in winding for the zero bit position of position 8 and to a read-in winding for the zero bit position of position 7. The zero bit position of position 8 also has a read-in winding connected to the alpha zero output terminal of the translator. This read-in winding is connected to the read-in driver 213, while the other read-in winding for position 8, which is connected to the serial output of the zero bit position of position 9, is connected to read-in driver 214. A third input winding of the zero bit position of position 8 is connected to the Distributor Bus 160. The read-in winding of the zero bit position of position 7, which is connected to the serial output of the zero bit position of position 9, is connected to read-in driver 213. The zero bit position of position 7 also has a read-in winding which is connected to the serial output of the zero bit position of position 8, the other end of this winding being connected to the read-in driver 214. The serial output of the zero bit position of the position 7 is connected to the zero bit positions of positions 6 and 5, the latter not shown. The other terminal of the read-in winding of the zero bit position of position 6, which is connected to the serial output of the zero bit position of position 7, is connected to the read-in driver 214. The zero bit position of position 6 also has a read-in winding which is connected to the serial output of the zero bit position of position 8. The other terminal of this read-in winding is connected to the read-in driver 213. Hence, if in the alpha mode, data will transfer from the translator 154 to positions 9 and 8; thereafter the data will be successively transferred to positions 7 and 6 simultaneously, etc. If in the numeric mode, data transfers from the translator 155 to position 9 and from position 9 to position 8, to position 7, to position 6, etc.

The outputs of the shift register 155 are taken from the zero position and from the one position, only the zero bit positions of these positions being shown, FIG. 5c. The zero bit position of the zero position has an input winding connected to the serial output of the zero bit position of position 1, the other terminal of this input winding being connected to read-in driver 214. The zero bit position of position 0 also has an input winding connected to the serial output of the zero bit position of position 2 the other end of this input winding being connected to read-in driver 213. The zero bit position of position 1 has a read-in winding connected to the serial output of the zero bit position of position 2, the other end of this winding being connected to the read-in driver 214. The zero bit position of position 1 also has a read-in winding connected to the serial output of the zero bit position of position 3, the other end of this winding being connected to read-in driver 213. The zero bit position of position 2 has a read-in winding connected to the serial output of the zero bit position of position 3, the other end of this winding being connected to read-in driver 214. The zero bit position of position 2 also has a read-in winding connected to a serial output of the zero bit position of position 4, not shown, the other end of this winding being connected to read-in driver 213. The zero bit position of position 3 has read-in windings connected to the zero bit positions of positions 4 and 5, not shown, the other ends of these windings being connected to read-in drivers 214 and 213, respectively.

The serial output of the zero bit position of position 1 is connected to a logical AND circuit 240 also having an input connected to the output of the alpha mode control latch 180. The serial output of the zero bit position of the zero position is connected to inputs of the logical AND circuits 241 and 242. Logical AND circuit 241 also has an input connected to the output of an inverter 243 having its input connected to the output of the alpha mode control latch 180. Logical AND circuit 242 has another input connected to the output of alpha mode control latch 180. Hence, the output from the zero position will be passed by the logical AND circuit 241 when not in the alpha mode control and will be passed by logical AND circuit 242 when in the alpha mode control. Under this latter condition, there will also be an output from position 1 because the logical AND circuit 240 will also be conditioned. The outputs of the logical AND circuits 240 and 241, FIG. 5c, are connected as inputs to a logical OR circuit 244 and the output thereof being connected to the numeric input terminals of the translator 154, FIG. 5b. The output of the logical AND circuit 242 is connected to the input of a logical OR circuit 245 having its output connected to the alpha input terminals of the translator 154. Logical OR circuit 245 also has an input connected to the output of logical AND circuit 246. Logical AND circuit 246 has an input connected to the output of logical AND circuit 247 and an input connected to the serial output of the sign position of the shift register. The single lines from the logical OR circuits 244 and 245 each actually represent five conductors which lead to the five numeric and five alpha input terminals of the translator 154.

Logical AND circuits 246 and 247 control the transfer of the sign from the sign position of the shift register 155 to the translator 154. Logical AND circuit 247 has an input connected to a conductor for receiving a Buffer A Serial Read-in Control signal, an input connected to a conductor for receiving a Tape Write Control signal, an input connected to a conductor connected to a latch 248, FIG. 5e, designated Buffer A Last Serial Shift, and an input connected to a conductor which leads to the output of the numeric mode control latch 181. Hence, when in the numeric mode, and when the last character has been shifted from the shift register 155 during a tape write operation, the sign is transferred from the sign position of the shift register 155 to the translator 154. The sign had been transferred to the sign position from the Distributor Bus 160 which has bit lines of 0 bit, 3 bit and 6 bit for representing the sign. A sign is not written on tape for alphabetic words.

During a tape read operation, the sign is read into the sign position from the translator under control of a logical AND circuit 249, FIG. 5c. Logical AND circuit 249 has an input connected to a conductor for receiving a Tape Read Control signal, an input connected to a conductor connecting to the output of Buffer A Serial Read-in latch 211, an input connected to a conductor connecting to the output of the numeric mode control latch 181, and an input connected to a conductor connecting to the output of a Buffer A Last Serial Shift latch 248. Hence, during a tape read operation, the sign is entered into the sign position of the shift register 155 from the translator 154 after the last serial shift, when in the numeric mode. Serial readout from the shift register 155 for a tape write operation is under control of a readout driver 250 which is driven by a U impulse.

As stated above, the tag portion of the shift register 155 functions to keep track of the number of places to be shifted. The tag portion of the register consists of ten denominationally ordered tag bit positions. Only the positions 9, 8, 7, 5, 4 and 0 are shown, the same being sufficient to illustrate the principle of operation. During read operations for a numeric word, the tag bit is inserted into position 9 and into position 4 for alphabetic words, while, for write operations, when in the numeric mode, the tag bit is inserted into position 8 and, when in the alpha mode, the tag bit is inserted into position 4.

The insertion of the tag bit into position 9 is under control of a logical AND circuit 255, FIG. 5d, having an input connected to the output of the numeric mode control latch 181, an input connected to a conductor for receiving a Buffer A First Serial Shift Control pulse, an input connected to a conductor for receiving a Tape Read Control signal, and an input connected to a conductor connecting to the Buffer A Serial Read-in latch 211. The output of the logical AND circuit 255 is connected to a bit insert driver 256 which also has an input connection for receiving a W impulse. The control signal designated Buffer A First Serial Shift comes from the output of Buffer A First Serial Shift latch 290, FIG. 5e, which has its set terminal connected to the output of a logical AND circuit 291. The logical AND circuit 291 has one input connected to receive a timing signal from X to Z and another input connected to the output of a Data Word Transfer Read-in latch 292.

The Data Word Transfer Read-in latch 292 has its set terminal connected to the output of a logical AND circuit 293 having one input connected to receive a timing signal U to W and another input connected to the output of a Data Word Transfer Readout latch 294. The Data Word Transfer Readout latch 294 has its set terminal connected to the output of a logical AND circuit 295. The logical AND circuit 295 has one input connected to the output of Buffer A Last Serial Shift latch 248, another input connected to the output of Buffer A Serial Read-in latch 211 and still another input which is connected to receive a timing impulse W to Y. For an alphabetic word during a read operation, the tag bit is inserted into position 4 under control of a logical AND circuit 257 having an input connected to a conductor receiving a Tape Read signal, an input connected to a conductor receiving a Buffer A First Serial Shift signal, an input connected to the output of the alpha mode control latch 180 and an input connected to the output of the Buffer A Serial Read-in latch 211. The output of logical AND circuit 257 is connected as an input to a logical OR circuit 258 having its output connected to a bit insert driver 262.

Insertion of the tag bit into the eighth position, during a tape write operation, is under control of a logical AND circuit 259 having an input connected to a conductor receiving a Data Word Transfer Read-in Control signal, an input connected to a conductor connecting to the sign position six bit of the Distributor Bus 160 and an input connected to a conductor for receiving a Tape Write Control signal. The output of the logical AND circuit 259 is connected to a bit insert driver 260 also having an input for receiving a W impulse.

The insertion of the tag bit into position 4, when in the alpha mode during a tape write operation, is under control of a logical AND circuit 261 having an input connected to a conductor for receiving a Tape Write signal, an input connected to a conductor for receiving a Data Word Transfer Read-in signal, an input connected to a conductor connecting to the sign position zero bit on the Distributor Bus and an input connected to a conductor connecting to the sign position three bit of the Distributor Bus. The output of the logical AND circuit 261 is connected to one of the inputs of logical OR circuit 258 having its output connected to the bit insert driver 262 also having an input for receiving a W pulse. The serial output from zero position of the tag portion of the shift register 155 is connected to a logical AND circuit 265 also having an input for receiving a W to Y impulse. The output of the logical AND circuit 265 is connected to a tag hold latch 266 having its output connected to an input of a logical AND circuit 267. Logical AND circuit 267 also has an input for receiving a Z to V impulse. The output of logical AND circuit 267 is connected to an input of a logical OR circuit 268. The output of the logical OR circuit 268 is connected to the set terminal of the Buffer A Last Serial Shift latch 248. Hence, sensing the tag bit out of the zero position during a tape write operation sets Buffer A Last Serial Shift latch 248; and this indicates that the sign may be transferred to the translator.

The Buffer A Last Serial Shift latch 248 may be also set during read operations under control of logical OR circuit 268 which has an input connected to the output of a logical AND circuit 269. Logical AND circuit 269 has an input connected to a conductor connecting to the output of an inverter 270, an input connected to a conductor for receiving a Translator Readout Sampling Control impulse coming from the output of a logical AND circuit 273, an input connected to a conductor connecting to the output of the numeric mode control latch 181, an input connected to a conductor for receiving a Read Bit 8 from the tape control unit 153 and an input connected to a conductor connecting to an inverter 271. The inverter 270 has its input connected to the output of the mode change latch 185. Inverter 271 has its input connected to the output of a logical AND circuit 272 having an input connected to a conductor for receiving Read Bit 8, an input connected to a conductor for receiving Read Bit 4, and an input connected to a conductor for receiving Read Bit B from the tape control unit 153. Logical AND circuit 273 has an input connected to a conductor for receiving a V to X timing control signal and an input connected to the output of the Buffer A Serial Read-in latch 211.

The Buffer A Serial Read-in latch 211 is set under control of a logical AND circuit 275, FIG. 5*d*, having an input connected to the output of Buffer A Serial Readout latch 276 and an input connected to a conductor for receiving a timing pulse U to W. Buffer A Serial Readout latch 276 is set under control of a logical OR circuit 277 having an input connected to a conductor for receiving a Write Start Control signal and an input connected to a conductor for receiving a Read Start signal. Resetting of the Buffer A Serial Readout latch 276 is under control of a logical AND circuit 278 having an input connected to a conductor for receiving a timing impulse X to Z and an input connected to a conductor connecting to the output of the Buffer A Serial Read-in latch 211. Resetting of the Buffer A Serial Read-in latch 211 is under control of logical AND circuit 279 having an input connected to a conductor for receiving a timing impulse Z to V and an input connected to a conductor connecting to the output of a Serial Shift Reset latch 280. The Serial Shift Reset latch 280 has its input connected to the output of a logical AND circuit 281, the same having an input connected to the output of the Buffer A Serial Read-in latch 211 and an input connected to a conductor for receiving a timing impulse X to Z.

The shifting of the tag bit occurs when the shift register 155 is shifted and is under control of a logical AND circuit 285, FIG. 5*d*, having one input connected to the output of the Buffer A Serial Read-in latch 211 and an input connected to the output of an inverter 286. The output of the inverter 286 essentially indicates no mode change and the inverter 286 has its input connected to the output of a logical AND circuit 287 having an input connected to receive a Tape Read signal and an input connected to the output of the mode change latch 185, FIG. 5*b*. Regeneration of the tag bit takes place when the tag bit is not shifted. This is accomplished by connecting the output of the Buffer A Serial Read-in latch 211 to the input of an inverter 288 having its output connected to each regeneration winding of all positions of the tag portion of the shift register 155.

From the above, it is seen that the invention provides an improved arrangement of apparatus for processing data in different modes. More specifically, it is seen that the invention, while generally applicable in data processing machines, is particularly useful in data processing machines capable of processing both alphabetic and numeric data where the numeric data is represented by a single character and the alphabetic data is represented by two characters. It is seen that the invention reduces data transfer time and results in a saving of apparatus.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data processing system for processing mixed alphabetic and numeric data, means for representing numeric characters by signals representing single characters; means for representing alphabetic characters by signals representing pairs of characters, one character of said pairs of characters being alphabetic, the other being numeric; a shift register having a plurality of denominationally ordered character positions; means for applying signals representing numeric characters to a first position of said denominationally ordered character positions; means for applying signals representing alphabetic characters to a position adjacent to said first position; and means for controlling said shift register so that signals representing numeric data are transferred from one position to an adjacent position as said shift register is shifted when only numeric characters are applied to said shift register and to alternate positions when both numeric and alphabetic characters are applied to said shift register, said signals representing alphabetic characters being simultaneously shifted to alternate positions as said signals representing numeric data are shifted.

2. In a data processing system, first and second data sources, means for representing data from said first source by signals representing single characters, means for representing data from said second source by signals representing single characters, a shift register having a plurality of denominationally ordered character positions, means for selectively applying signals representing characters from said first data source to one character position of said shift register, and means for selectively applying signals representing characters from said second data source to another character position of said shift register simultaneously with the application of signals from said first source to said one character position.

3. In a data processing system as in claim 2 further including means for shifting data characters within said shift register from character position to character position successively when said data characters are applied to said shift register only from said first data source.

4. In a data processing system as in claim 2 further including means for shifting data characters within said shift register to alternate character positions when said data characters are simultaneously applied to said shift register from said first and second data sources.

5. In a data processing machine, a data source for furnishing data in the form of signals representing characters; means connected to said data source to receive data therefrom and translate the same into single characters and pairs of characters depending upon the combination of signals coming from said data source; gating means operably connected to said data source to become active when there is a change in combinations of signals representing single characters to combinations of signals representing pairs of characters, said gating means including control means for controlling the passage of single characters and pairs of characters coming from said means connected to the data source; a shift register having a plurality of denominationally ordered character positions; means for applying single characters passed by said gating means to a first position of said shift register; and means for simultaneously applying pairs of characters passed by said gating means to said first position and a second position of said shift register.

6. In a data processing machine as in claim 5 further comprising means operably controlled by said gating means to shift data characters within said shift register from character position to character position successively when single characters are applied to said shift register and to shift data characters from character positions to alternate character positions successively when pairs of characters are applied to said shift register.

7. Apparatus for controlling the reception and transfer of data of and within a shift register comprising a shift register having a plurality of denominationally ordered character positions, means for serially applying data to a first position of said plurality of positions of said shift register, means for shifting data successively within said shift register from position to position when data is serially applied to said first position, means for serially applying data selectively to a second position of said shift register simultaneously with the serial application of data to said first position, means for suspending the shifting of data successively from position to position when data is simultaneously applied to said first and second positions, and means for shifting data successively from said first and second positions to alternate successive positions as data is simultaneously applied to said first and second positions.

8. Apparatus as in claim 7 further comprising means for providing a serial output of data from a last denominationally ordered position of said shift register when data is only applied serially to said first position, and means for providing a serial output of data from said last and the next to said last denominationally ordered position when data is applied serially to said first and second denominationally ordered positions of said shift register.

9. In a data processing machine; a data translator, said translator having one set of data inputs for receiving bits of data for representing characters according to one code, connecting means connected to said one set of inputs for converting these bits of data to bits of data for representing characters according to a second code, said second code including a first group of data bits to represent numeric characters and a second group of data bits to represent alphabetic characters and sets of numeric and alphabetic outputs connected to said converting means; a shift register having a series of denominationally ordered positions, each position being comprised to represent data according to said second code; means for connecting said numeric outputs of said translator to a first position of said shift register; means for connecting said alphabetic outputs of said translator to a second position of said shift register; and means for controlling the shifting of data within said shift register so that when data bits are available only at said numeric outputs, the data is shifted from said first position to an adjacent position successively and when data bits are available at both the numeric and alphabetic outputs, data is shifted from said first and second positions to alternate positions successively.

10. The data processing machine of claim 9 further comprising: means for determining when all of the positions of the shift register are occupied with data.

11. The data processing machine of claim 10 wherein said data translator further includes: sets of numeric and alphabetic inputs for receiving bits of data to represent characters according to said second code; second converting means connected to said sets of numeric and alphabetic inputs for converting bits of data representing characters according to said second code to bits of data representing characters according to said first code and a set of outputs connected to said second converting means to receive bits representing data according to said first code; first connecting means for selectively connecting the output of the last position of said shift register to said numeric and alphabetic inputs of said translator; second connecting means for selectively connecting the output of the next to the last position of the shift register to the numeric inputs of said translator; and control means for controlling said first and second connecting means whereby said first connecting means connects the output of said last position to said alphabetic inputs when said second connecting means connects the output of said next to the last position to said numeric inputs and said first connecting means connects the output of said last position to said numeric inputs in the absence of said second connecting means connecting the output of said next to the last position to said numeric inputs.

References Cited by the Examiner

UNITED STATES PATENTS

| | | | |
|---|---|---|---|
| 2,801,406 | 7/57 | Lubkin | 235—92 |
| 2,872,666 | 2/59 | Greenhalgh | 235—157 X |
| 2,925,218 | 2/60 | Robinson et al. | 235—157 |

ROBERT C. BAILEY, *Primary Examiner.*

WALTER W. BURNS, Jr., MALCOLM A. MORRISON, *Examiners.*